(12) United States Patent
Wang et al.

(10) Patent No.: US 12,391,562 B2
(45) Date of Patent: Aug. 19, 2025

(54) PREPARATION DEVICE AND PREPARATION METHOD OF AMMONIA GAS

(71) Applicant: YUANCHU TECHNOLOGY (BEIJING) CO., LTD., Beijing (CN)

(72) Inventors: Qi Wang, Beijing (CN); Changjun Yu, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 882 days.

(21) Appl. No.: 17/426,744

(22) PCT Filed: Aug. 12, 2019

(86) PCT No.: PCT/CN2019/100143
§ 371 (c)(1),
(2) Date: Jul. 29, 2021

(87) PCT Pub. No.: WO2020/155603
PCT Pub. Date: Aug. 6, 2020

(65) Prior Publication Data
US 2022/0098048 A1    Mar. 31, 2022

(30) Foreign Application Priority Data

Jan. 29, 2019   (CN) .......................... 201910084166.9

(51) Int. Cl.
*C01C 1/02*   (2006.01)
*B01J 8/18*   (2006.01)
(Continued)

(52) U.S. Cl.
CPC ............ *C01C 1/026* (2013.01); *B01J 8/1827* (2013.01); *B01J 8/1836* (2013.01); *B01J 8/26* (2013.01);
(Continued)

(58) Field of Classification Search
None
See application file for complete search history.

(56) References Cited

U.S. PATENT DOCUMENTS 2,586,818 A * 2/1952 Harms .................... B01J 8/36
                                                209/474
2,787,524 A   4/1957 Claflin, Jr.
(Continued)

FOREIGN PATENT DOCUMENTS

CN    101962563 A    2/2011
CN    102241996 A    11/2011
(Continued)

OTHER PUBLICATIONS

The extended European Search Report for European Patent Application No. 19913273.9, dated Oct. 13, 2022, 6 pages.
(Continued)

*Primary Examiner* — Jennifer A Leung
(74) *Attorney, Agent, or Firm* — Westman, Champlin & Koehler, P.A.

(57) ABSTRACT

Disclosed are a preparation device and a preparation method of ammonia gas. The preparation device, prepares ammonia gas by reacting ammonium chloride with a particulate inorganic salt, includes one fluidized bed reactor with at least two fluidization chambers, in which one is a preheating chamber configured to preheat the particulate inorganic salt, and the other is a reaction chamber inside provided with at least one atomizing nozzle, the particulate inorganic salt forming a fluidized bed layer and reacting with an aqueous solution of ammonium chloride in the reaction chamber to generate the ammonia gas. The particulate inorganic salt can be sequentially flowed through a plurality of preheating chambers and reaction chambers under an impetus of a (Continued)

density difference of the particulate bed layers, finally achieving the required conversion rate.

14 Claims, 1 Drawing Sheet

(51) Int. Cl.
*B01J 8/26* (2006.01)
*B01J 8/36* (2006.01)
(52) U.S. Cl.
CPC .......... *B01J 8/36* (2013.01); *B01J 2208/0053* (2013.01); *B01J 2208/00752* (2013.01); *B01J 2208/0084* (2013.01); *B01J 2208/00902* (2013.01); *B01J 2208/00938* (2013.01)

(56) References Cited

U.S. PATENT DOCUMENTS

| | | | | |
|---|---|---|---|---|
| 4,237,814 | A | * | 12/1980 | Ormos ................. B01J 8/26 118/DIG. 5 |
| 4,293,532 | A | | 10/1981 | Sasaki et al. |
| 5,264,196 | A | * | 11/1993 | Tanaka ................. C01G 43/066 423/259 |
| 6,290,775 | B1 | * | 9/2001 | Kohlen ................ B01J 2/16 118/DIG. 5 |
| 10,273,166 | B2 | | 4/2019 | Zhou |
| 2017/0101326 | A1 | | 4/2017 | Zhou |

FOREIGN PATENT DOCUMENTS

| | | | | |
|---|---|---|---|---|
| CN | 101962563 | B | | 11/2013 |
| CN | 103588210 | A | | 2/2014 |
| CN | 105417823 | A | | 3/2016 |
| CN | 103588210 | B | | 12/2016 |
| CN | 106745061 | A | | 5/2017 |
| CN | 106403639 | B | | 10/2018 |
| CN | 109467090 | A | | 3/2019 |
| CN | 109626395 | A | | 4/2019 |
| CN | 209890262 | U | | 1/2020 |
| EP | 3315192 | A1 * | 5/2018 | ............ B01J 2/16 |
| FR | 1385447 | A | | 1/1965 |
| FR | 1395701 | A | | 4/1965 |
| JP | S5159100 | A | | 5/1976 |
| SU | 1586765 | A * | 8/1990 | |

OTHER PUBLICATIONS

International Search Report and Written Opinion (including English translations) for International Application No. PCT/CN2019/100143, dated Oct. 30, 2019, 17 pages.

Zhao, Xiaofeng, "Study on the Technology for Decomposing of Ammonium Chloride", Science-Engineering (A), China Master's Theses Full-Text Database, No. 06, Jun. 15, 2015, 15 pages.

Zhai Guangwei et al., "Decomposition of Ammonium Chloride for Production of Ammonia and Hydrogen Chloride", The Chinese Journal of Process Engineering, vol. 9 No. 1, Feb. 2009, 12 pages.

* cited by examiner

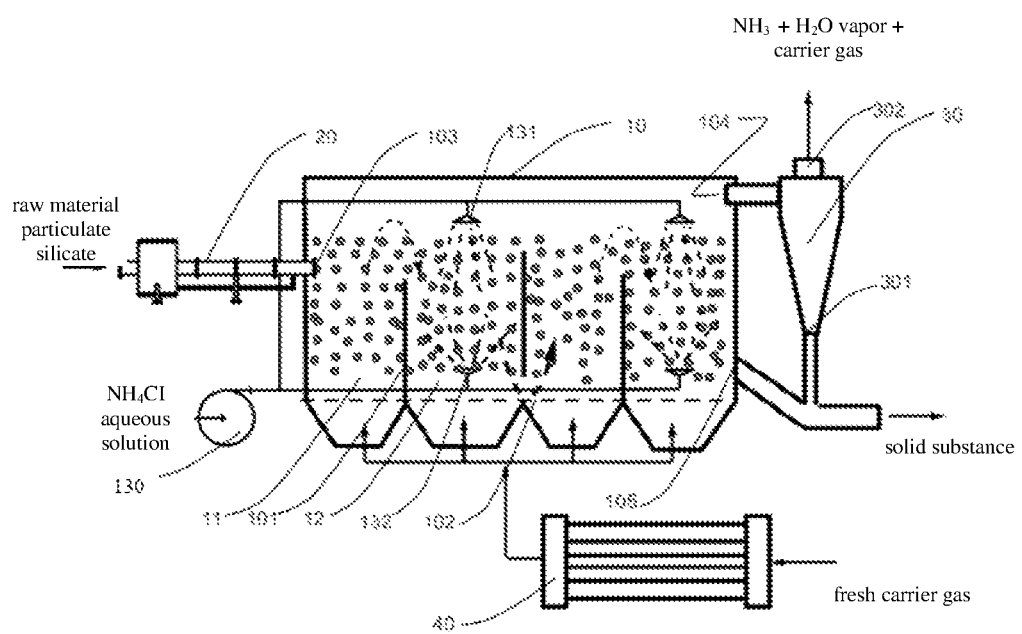

PREPARATION DEVICE AND PREPARATION METHOD OF AMMONIA GAS

CROSS-REFERENCE TO RELATED APPLICATIONS

This Application is a Section 371 National Stage Application of International Application No. PCT/CN2019/100143, filed on Aug. 12, 2019, and published as WO 2020/155603 A1, on Aug. 6, 2020, not in English, which claims priority to Chinese Patent Application No. 201910084166.9, filed on Jan. 29, 2019 and entitled "Preparation Device and Preparation Method of Ammonia Gas", the contents of which are incorporated herein by reference in their entireties.

FIELD OF TECHNOLOGY

The present disclosure relates to the field of inorganic salts and soda ash chemical industry, in particular, to a preparation device and a preparation method of ammonia gas.

BACKGROUND

The soda industry produces a large amount of by-product of ammonium chloride, which has become the bottleneck of the soda industry due to the limitation in the application of chemical fertilizers, so it is urgent to find a suitable utilization method. If ammonium chloride is decomposed into $NH_3$ and HCl with higher economic value, $NH_3$ can be recycled in the soda industry, and HCl can also be applied in many fields such as organic chloride. Therefore, preparing $NH_3$ and HCl by the decomposition of ammonium chloride is a good way to solve the bottleneck problem of soda ash industry.

Ammonium chloride can be decomposed into $NH_3$ and HCl by heating, but at the same time a large amount of ammonium chloride is sublimated. Moreover, the generated $NH_3$ is difficult to separate from HCl, and small ammonium chloride particles are easily to generate. In order to obtain the decomposed products $NH_3$ and HCl from the ammonium chloride, a feasible method is adding reusable acidic (or alkaline) substances to the reactant $NH_4Cl$, and heating to release HCl (or $NH_3$) first, followed by releasing $NH_3$ (or HCl) at a higher temperature. For example, in some patents (U.S. Pat. Nos. 2,787,524, 4,293,532), a preliminary experimental study on the stepwise reaction method of $NH_4HSO_4$, $(NH_4)_2SO_4$ and ammonium chloride after blending and melting; additionally, some researchers have proposed a method for decomposing ammonium chloride using MgO (Zhai Guangwei et al., Process Engineering Journal, 2009, 19: 59-62). These methods can be divided into two types according to the different reactants, namely an ammonium bisulfate method and a magnesium oxide method. The ammonium bisulfate method and the magnesium oxide has to perform regeneration by heating and other methods, causing complicated process, requiring more than one device to complete the above reaction, and leading to generally high energy consumption.

SUMMARY

In view of this, for the above problems in the prior art, the present disclosure provides a device for preparing ammonia gas by reacting ammonium chloride with inorganic salt, in which $NH_3$ may be generated in just one step, simplifying reaction steps.

A preparation device for preparing ammonia gas by reacting ammonium chloride with raw material of particulate inorganic salts provided by the present disclosure includes a fluidized bed reactor with at least two fluidization chambers, in which one is a preheating chamber configured to heat the particulate inorganic salt, and the other is a reaction chamber configured for the particulate inorganic salt to contact and react with an aqueous solution of ammonium chloride to generate the ammonia gas; the reaction chamber of the fluidized bed reactor is provided inside with at least one atomizing nozzle configured to atomize an ammonium chloride aqueous solution; carrier gas is introduced into the fluidization chamber to form the particulate inorganic salt into a fluidized particle bed layer; wherein an empty bed gas velocity of the carrier gas in the preheating chamber is higher than the empty bed gas velocity in the reaction chamber, so that a density of the particulate bed layer in the preheating chamber is smaller than a density of the particulate bed in the reaction chamber.

Preferably, the fluidized bed reactor is provided inside with a plurality of longitudinally-arranged fluidization chambers, the fluidization chambers are separated by deflectors, and gas-phase spaces of all fluidization chambers are connected each other; a bottom of the fluidization chamber is provided with a gas distributor configured to distribute and fluidize the carrier gas for the particulate inorganic salt. The plurality of fluidization chambers include the preheating chamber and the reaction chamber; at least one reaction chamber is disposed between any two of the preheating chambers; a bottom of the preheating chamber and a bottom of a next adjacent reaction chamber are not connected each other, and a height of the deflector between the preheating chamber and the next adjacent reaction chamber is lower than a height of the particulate bed layers in the two chambers; a bottom of the preheating chamber and a bottom of a previous adjacent reaction chamber are connected each other, and a height of the deflector between the preheating chamber and the previous adjacent reaction chamber is higher than a height of the particulate bed layers in the two chambers; the "previous" means closer to the solid feed port, and the "next" means farther from the solid feed port.

The preparation device according to the present disclosure, characterized in that the fluidized bed reactor includes a solid feed port, a solid discharge port, and an exhaust port; the solid feed port is located at a first fluidization chamber, and the first fluidization chamber is the preheating chamber; the solid discharge port is configured to discharge reacted solid substances, and located at the fluidization chamber farthest from the solid feed port, and the fluidization chamber farthest from the solid feed port is the reaction chamber; the exhaust port is located at the gas-phase space of all the fluidization chambers that are connected each other, and is configured to discharge reacted gaseous substances; the reacted solid substance refers to a mixture of a reaction product and an unreacted particulate inorganic substance; the gaseous substance refers to a mixture of ammonia gas, water vapor, and the carrier gas generated by the reaction. The solid discharge port is located at the bottom of the fluidization chamber; the solid feed port is located at an upper part of the fluidization chamber and below an upper interface of the particulate bed layer.

The preparation device according to the present disclosure, further characterized in that the reaction chambers inside is provided at least one atomizing nozzle, wherein the atomizing nozzle is located either above the solid particulate bed layer or located inside the solid particulate bed layer; preferably, each of the reaction chambers inside is provided two sets of atomizing nozzles, wherein one set of atomizing nozzles is located above the particulate bed layer, and the other set of atomizing nozzles is located inside the particulate bed layer, each set of atomizing nozzles including at least one atomizing nozzle. The atomizing nozzle is a pressure spray nozzle or a centrifugal spray nozzle.

The preparation device according to the present disclosure, characterized by further including a gas-solid separator and a solid feed device; the solid feed device is communicated with the solid feed port of the fluidized bed reactor for transporting the particulate inorganic salt into the preheating chamber; the gas-solid separator is communicated with the exhaust port of the fluidized bed reactor for separating the solid substance entrained by the gaseous substance discharged from the exhaust port; the separator has an exhaust port and a discharge port, which are respectively configured to output the gaseous substance and the solid substance.

In another aspect of the present disclosure, with the preparation device of the present disclosure, a preparation method for preparing ammonia gas with ammonium chloride as raw material includes steps of: heating the carrier gas to a first preset temperature and introducing it into the fluidization chamber; introducing the particulate inorganic salt into a first fluidization chamber (preheating chamber) of the fluidized bed reactor through the solid feed device to form the particulate bed layer and preheat it to a second preset temperature; flowing a preheated particulate inorganic salt from an upper part of the deflector into a next adjacent reaction chamber under the action of a density difference of the particulate bed layers between the preheating chamber and the reaction chamber; spraying the solution of ammonium chloride into the reaction chamber through the atomizing nozzle to contact and react with the particulate inorganic salt for generating the ammonia gas and a reacted solid substance; moving continuously the reacted solid substance towards a fluidization chamber farther from the feed port under the action of the density difference of the particulate bed layers, and into the preheating chamber from a communication space below the preheating chamber adjacent to the reaction chamber for preheating again to the second preset temperature to enter a next reaction chamber, so as to finally discharge from the solid discharge port after passing through all preheating chambers and reaction chambers. The ammonia gas obtained by the reaction is mixed with the reacted gaseous substance, enters the gas-solid separator through the exhaust port, and the gas phase obtained by separation contains ammonia gas product.

Preferably, in each of the reaction chambers, a temperature in the reaction chamber is maintained not less than a third preset temperature. The relationship among the first, second and third preset temperatures is: the first preset temperature is 100 to 300° C. higher than the third preset temperature, the second preset temperature is 0 to 250° C. higher than the third preset temperature, and the particulate inorganic salt is ensured not to be decomposed; the third preset temperature is a reaction temperature.

The particulate inorganic salt in the present disclosure is, preferably, one or a mixture of any ratios of calcium silicate, magnesium silicate, sodium metasilicate, and potassium silicate, and the particulate inorganic salt has a particle diameter of 0.5 mm to 2 mm.

The carrier gas in the present disclosure is, preferably, air.

For a preparation device and method for preparing ammonia gas by decomposing ammonium chloride provided by the present disclosure, through the reaction between the inorganic salt and the atomized solution of ammonium chloride on the particle surface, ammonia gas and solid products are generated, so as to achieve the purpose of obtaining ammonia gas; the particulate inorganic salt in the reactor is distributed in a fluidized state, and the solution of ammonium chloride is distributed in a droplet form, so that the solid-liquid contact efficiency and heat transfer efficiency are improved, thereby speeding up the reaction. Compared with the prior art, in the solutions of the present disclosure, only one step reaction is required in the preparation device to obtain ammonia gas, which simplifies the reaction steps, reduces the difficulty in operations, and further reduces the difficulty in scaling up the preparation device.

BRIEF DESCRIPTION OF THE DRAWINGS

The above and other objects, features and advantages of the present disclosure will become more apparent from the description below with reference to the accompanying drawings.

FIG. 1 is a diagram showing the preparation device of the embodiment of the present disclosure.

DESCRIPTION OF THE EMBODIMENTS

The present invention will be described in more detail below with reference to the accompanying drawings. In the various FIGURES, the same elements are denoted by the similar reference numerals. For the sake of clarity, the various parts in the figures are not drawn to scale. In addition, some well-known parts may not be shown.

In the following, many specific details of the disclosure are described, in order to better understand the disclosure. As will be understood by those skilled in the art, the disclosure may be practiced without these specific details.

Chemical reactions and reaction temperatures for preparing ammonia gas in the presence of ammonium chloride as an aqueous solution by reacting with ammonium chloride respectively with calcium silicate, magnesium silicate, sodium metasilicate, potassium silicate as raw materials are shown in Table 1:

TABLE 1

Chemical reactions and reaction temperatures for preparing ammonia gas

| Chemical reactions | Reaction temperatures |
| --- | --- |
| $2NH_4Cl + CaSiO_3 \rightarrow CaCl_2 + SiO_2 + 2 NH_3\uparrow$ | 280-350° C. |
| $2NH_4Cl + MgSiO_3 \rightarrow MgCl_2 + SiO_2 + 2 NH_3\uparrow$ | 330-420° C. |
| $2NH_4Cl + Na_2SiO_3 \rightarrow 2NaCl + SiO_2 + 2NH_3\uparrow$ | 90-160° C. |
| $2NH_4Cl + K_2SiO_3 \rightarrow 2KCl + SiO_2 + 2NH_3\uparrow$ | 80-160° C. |

Since the principles and operations of these reactions are similar except for adjust the preheating temperature, the carrier temperature and the temperature of the fluidization chamber appropriately according to the reaction temperature, the following description mainly takes calcium silicate as an example to describe specific embodiments of the present disclosure.

FIG. 1 is a diagram showing the preparation device of the embodiment of the present disclosure, wherein there are 2 reaction chambers and 2 preheating chambers. Since the design and principle for the device with more reaction chambers and preheating chambers are similar, the present disclosure will not list them one by one. The preparation device includes a fluidized bed reactor 10, a solid feed port 20, a gas-solid separator 30, a gas preheater 40 and a plurality of connecting pipes.

The fluidized bed reactor 10 includes four longitudinally-arranged fluidization chambers and a deflector 101, wherein the four longitudinally-arranged fluidization chambers are used as two preheating chambers 11 and two reaction chambers 12, the preheating chambers 11 and the reaction chambers 12 are alternately arranged, and adjacent preheating chambers 11 and adjacent reaction chambers 12 are separated by the deflector 101.

The fluidized bed reactor 10 further includes a gas distributor 102, a solid feed port 103, an exhaust port 104 and a discharge port 105. In the present embodiment, a first fluidization chamber is the preheating chamber 11, and the solid feed port 103 is located at an upper part of the first fluidization chamber and below an upper interface of the particulate bed layer for adding the particulate in organic salt. The last fluidization chamber is the reaction chamber 12, and the exhaust port 105 is located at a lower part of the last fluidization chamber for discharging the reacted solid substances. The gas distributor 102 is disposed at a bottom of each of the fluidization chambers, and carrier gas enters each of the fluidization chambers through the gas distributor 102. The exhaust port 104 is communicated with the gas-phase spaces above all fluidization chambers for discharging a reacted gaseous substance.

The fluidized bed reactor 10 further includes an atomizing nozzle disposed inside the reaction chambers 12, wherein at least 1 atomizing nozzle is disposed in each of the reaction chambers 12. In the device shown in FIG. 1, two atomizing nozzles are disposed in each of the reaction chambers, in which one atomizing nozzle 131 is located below the solid particulate bed layer for spraying the ammonia chloride solution downward to form a droplet form and contact the particles in the bed layer, and the other atomizing nozzle 132 is located inside the solid particulate bed layer for spraying the ammonia chloride solution upward to form a droplet form and contact the particles in the bed layer, wherein the atomizing nozzles 131 and 132 are pressure spray nozzles or centrifugal spray nozzles. In some preferred embodiments, two atomizing nozzles may be disposed in each of the reaction chambers, in which one set of atomizing nozzles is located above the solid particulate bed layer for spraying the ammonia chloride solution downward to form a droplet form and contact the particles in the bed layer, and the other set of atomizing nozzles is located inside the solid particulate bed layer for spraying the ammonia chloride solution upward to form a droplet form and contact the particles in the bed layer.

In the preparation device according to the present disclosure, since the carrier gas enters each of fluidization chambers via the gas distributor 102, an empty bed gas velocity of the carrier gas in the preheating chamber 11 is higher than an empty bed gas velocity of the reaction chamber 12 in order to make a density of the particulate bed in the preheating chamber 11 smaller than a density of the particulate bed in the reaction chamber 12, so that a density difference between the bed layers is used to promote the fluidized particulate inorganic salt to alternately flow between the preheating chamber 11 and the reaction chamber 12. A feasible technical solution for achieving the empty bed gas velocity of the carrier gas in the preheating chamber 11 to be higher than an empty bed gas velocity of the reaction chamber 12 is that the preheating chamber 11 has the same ventilation volume as the reaction chamber 12, but the preheating chamber 11 has a smaller cross-sectional area than the reaction chamber 12. Of course, equivalent technical solutions in which ventilation volumes are different may also be used.

In some preferred embodiments, in order to make the particulate inorganic salt to alternately flow between the preheating chamber 11 and the reaction chamber 12, except for making the empty bed gas velocity of the carrier gas in the preheating chamber 11 higher than an empty bed gas velocity of the reaction chamber 12, the following technical solution may be also adopted: a bottom of the preheating chamber 11 and a bottom of a next adjacent reaction chamber 12 are not connected with each other, but the deflector 101 between them is lower than the height of the particle bed layers in the two chambers, so that particles may flow from the upper part of the preheating chamber 11 into the next adjacent reaction chamber 12; a bottom of the preheating chamber 11 and a bottom of a previous adjacent reaction chamber 12 are connected with each other, but the deflector 101 between them is higher than the height of the particle bed layers in the two chambers, so that particles may flow from the upper part of the reaction chamber 12 into the next preheating chamber 11, as shown by arrows in FIG. 1. Since the bed layer of the reaction chamber 12 has a larger density, the pressure of the reaction chamber 12 is higher than the pressure of the next adjacent preheating chamber 11 at where bottoms are connected, and then the particles may flow to the next preheating chamber under pressure, which cause the height of the bed layer of the reaction 12 to decrease, so the particles in the previous preheating chamber 11 of the reaction chamber 12 flow into the reaction chamber 12 from the upper part of the deflector 101.

The preparation device of the embodiment of the present disclosure has the following working process: the carrier gas is heated to a first preset temperature through the gas preheater 40 and then introduced from the gas distributor 102 to the fluidization chamber; a solid feeder 20 is used to add the particulate inorganic salt to the corresponding preheating chamber 11 through the solid feed port 103 for heating the particulate inorganic salt to a second preset temperature. The preheated particulate inorganic salt is flowed from the upper part of the deflector 101 into the next adjacent reaction chamber 12 under the action of a density difference of the particulate bed layers between the preheating chamber 11 and the reaction chamber 12; the solution of ammonium chloride is spayed into the reaction chamber 12 through the atomizing nozzles 131 and 132 to contact and react with the particulate inorganic salt for reacting on the surface of the particles and generating the ammonia gas and a reacted solid substance, wherein to smooth the reaction, the temperature of the reaction chamber 12 is required to maintain at a third preset temperature; the reacted solid substance is moved continuously towards a fluidization chamber farther from the feed port 103 under the action of the density difference of the particulate bed layers, and into the preheating chamber 11 from a communication space below the preheating chamber 11 adjacent to the reaction chamber 12 for preheating again to the second preset temperature to enter a next reaction chamber 12, so as to finally discharge from the discharge port 105 after passing through all preheating chambers 11 and reaction chambers 12. The ammonia gas obtained by the reaction is mixed with the reacted gaseous substance, enters the gas-solid separator 30 through the exhaust port 104, and the separated gas phase containing ammonia gas is discharged from a gas outlet 302 of gas-solid separator; the solid substances obtained by separation is fed into subsequent processing units after being mixed with solid substances discharged by the discharge port 105 of fluidized bed reactor through the solid discharge port 301 of gas-solid separator.

Among them, the third preset temperature is the reaction temperature, which may be selected from the reaction temperature range in Table 1 according to specific raw materials. The particulate inorganic salt does not decompose at the first preset temperature, the second preset temperature, and the third preset temperature. Since the reaction proceeds on the surface of the particulate inorganic salt, and the temperature of the droplet is lower, a preheating temperature (i.e., the second preset temperature) of the particulate inorganic salt has to be higher than the reaction temperature (the third preset temperature) in order to smooth the reaction, wherein preferably, the second preset temperature is 0 to 250° C. higher than the third preset temperature. Since the raw material particulate inorganic salt is heated in the preheating chamber 11 by the carrier gas, the temperature of the carrier gas (i.e., the first preset temperature) is higher than the preheating temperature of the raw material particulate inorganic salt (i.e., the second preset temperature), wherein preferably, the first preheating temperature is 100 to 300° C. higher than the third preset temperature.

The raw material particulate inorganic salt in the present disclosure is, preferably, one or a mixture of any ratios of calcium silicate, magnesium silicate, sodium metasilicate, and potassium silicate, and the raw material particulate inorganic salt has a particle size range of 0.5 to 2 mm in diameter; the carrier gas is preferably air.

The features of the present disclosure will be further described below in combination with some specific embodiments.

In Embodiment 1, a raw material particulate calcium silicate is reacted with ammonium chloride to prepare ammonia gas. In the device adopted, the fluidized bed reactor has a total volume of 60 L, with a structure shown in FIG. 1, including 4 longitudinally-arranged cuboid fluidization chambers, wherein the 1st and 3rd fluidization chambers are preheating chambers 11 with volumes of 10 L (0.08 m×0.15 m×0.9 m), the 2nd and 4th chambers are reaction chambers 12 with volumes of 20 (0.15 m×0.15 m×0.9 m), and the particulate bed layer for the operation of each of the fluidization chambers has a height of 0.64 m; two pressure atomizing nozzles 131 and 132 are provided in each of the reaction chambers 12, in which one is located in the gas-phase space above the reaction chamber 12 with a distance of 0.1 m from an upper edge of the particulate bed layer, and the other is located inside the particulate bed layer with a distance of 0.48 from the upper edge of the bed layer. The raw material particulate calcium silicate used is wollastonite ore particle, with an average diameter of 0.8 mm, and the content of calcium silicate is 82%; air is used as the carrier gas, operation is performed at normal pressure, air is preheated in the heater to 495° C., air flow in the fluidization chamber is 15.4 m³/h (under standard conditions), this air is used to preheat the wollastonite ore powder to 400° C. in the preheating chamber, and the reaction chamber has a temperature controlled to 320° C. The solution of ammonium chloride with a mass fraction of 40.8% and a temperature of 90° C. is sprayed into the particulate bed layer by a high-pressure pump 130 through an atomizing nozzle, with a spray volume of 0.95 kg/h; loading of solid particles throughout the reactor is 34.5 kg, and the amount of wollastonite ore powder added is 0.77 kg/h; the reaction results are shown in Table 2.

TABLE 2

Reaction results for calcium silicate in 60 L reactor

| Material | Calcium chloride | Ammonia gas |
|---|---|---|
| Flow (kg/h) | 0.37 | 0.11 |
| Conversion rate of ammonium chloride (%) | 92 | |
| Conversion rate of calcium silicate (%) | 61 | |

In Embodiment 2, the ammonia gas is prepared by reacting anhydrous sodium metasilicate ($Na_2SiO_3$) particles with ammonium chloride, and the device adopted is the same as that in Embodiment 1. The air is used as the carrier gas, operation is performed at normal pressure, air is preheated in the heater to 300° C., air flow in the fluidization chamber is 22 m³/h (under working conditions), this air is used to preheat the anhydrous sodium metasilicate particles to 220° C. in the preheating chamber 11, and the reaction chamber 12 has a temperature controlled to 140° C. The solution of ammonium chloride with a mass fraction of 40.8% and a temperature of 90° C. is sprayed into the particulate bed layer by a high-pressure atomizing pump through the atomizing nozzles 131 and 132, with a spray volume of 1.65 kg/h; loading of sodium metasilicate particles throughout the fluidized bed reactor 10 is 33.1 kg, the sodium metasilicate particles have an average particle size of 1 mm, and the amount added is 0.92 kg/h; the reaction results are shown in Table 3.

TABLE 3

Reaction results for sodium metasilicate in 60 L reactor

| Material | Sodium chloride | Ammonia gas |
|---|---|---|
| Flow (kg/h) | 0.65 | 0.19 |
| Conversion rate of ammonium chloride (%) | 88 | |
| Conversion rate of sodium metasilicate (%) | 73 | |

In Embodiment 3, a raw material particulate calcium silicate is reacted with ammonium chloride to prepare ammonia gas. In the device adopted, the fluidized bed reactor 10 has a total volume of 240 L, including 2 longitudinally-arranged cuboid fluidization chambers, wherein the 1st fluidization chamber is the preheating chamber with a volume of 96 L (0.2 m×0.3 m×1.6 m), the 2nd chamber is the reaction chamber with a volume of 144 L (0.3 m×0.3 m×1.6 m), and the particulate bed layer for the operation of each of the fluidization chambers has a height of 1.35 m; two pressure atomizing nozzles, both located inside the particulate bed layer, are provided in each of the reaction chambers, and two nozzles 131 and 132 are arranged coaxially vertically, in which one is 0.2 m from the upper edge of the bed layer and is sprayed downwardly, and the other is 1.3 m from the upper edge of the bed layer and is sprayed upwardly; the raw material particulate calcium silicate used is wollastonite ore particle, with an average diameter of 0.8 mm, and the content of calcium silicate is 82%; air is used as the carrier gas, operation is performed at normal pressure, air is preheated in the heater to 500° C., air flow in the fluidization chamber is 58 m³/h (under standard conditions), this air is used to preheat the wollastonite ore powder to 420° C. in the preheating chamber, and the reaction chamber has a temperature controlled to 350° C. The solution of ammonium chloride with a mass fraction of 40.8% and a temperature of 90° C. is sprayed into the particulate bed layer by a high-pressure atomizing pump through an atomizing nozzle, with a spray volume of 2.1 kg/h; loading of wollastonite ore particles throughout the fluidized bed reactor 10 is 159 kg, and the amount of wollastonite ore particles added is 4.2 kg/h; the reaction results are shown in Table 4.

TABLE 4

Reaction results for calcium silicate in 60 L reactor

| Material | Calcium chloride | Ammonia gas |
|---|---|---|
| Flow (kg/h) | 0.37 | 0.11 |
| Conversion rate of ammonium chloride (%) | | 94 |
| Conversion rate of calcium silicate (%) | | 63 |

It should be noted that according to the common knowledge of those skilled in the art, corresponding preparation and measurement and control devices such as temperature and corresponding valves are also provided on the preparation device. This does not indicate that these conventional designs are not included in the process of the disclosure. Adjusting the feed rate of the raw materials in the present disclosure according to the conversion rate and material balance is also a conventional design common to those skilled in the art, which are not explained one by one in the present disclosure. This does not mean that the conventional design is not included in the process of the present disclosure.

The embodiments in accordance with the present invention, as described above, are not described in detail, and are not intended to limit the present invention to be only the described particular embodiments. Obviously, many modifications and variations are possible in light of the above. These embodiments have been chosen and described in detail by the specification to explain the principles and embodiments of the present invention so that those skilled in the art can make good use of the present invention and the modified use based on the present invention.

What is claimed is:

1. A preparation device of ammonia gas, configured to prepare ammonia gas by reacting ammonium chloride with a particulate inorganic salt, comprising a fluidized bed reactor, the fluidized bed reactor comprising:
    at least one preheating chamber, configured to preheat the particulate inorganic salt;
    at least one reaction chamber, configured for the particulate inorganic salt to contact and react with an aqueous solution of ammonium chloride to generate the ammonia gas, wherein the at least one preheating chamber has a smaller cross-sectional area than that of the at least one reaction chamber, so that an empty bed gas velocity of carrier gas in the at least one preheating chamber is higher than an empty bed gas velocity of the carrier gas in the at least one reaction chamber;
    at least one deflector, the at least one preheating chamber and the at least one reaction chamber are alternately arranged longitudinally, and the at least one deflector is located between a preheating chamber and a reaction chamber that are adjacent to each other to separate the preheating chamber and the reaction chamber that are adjacent to each other; and
    at least one atomizing nozzle, located in the at least one reaction chamber, configured to atomize the ammonium chloride aqueous solution,
    wherein the carrier gas is introduced into the at least one preheating chamber and the at least one reaction chamber to cause the particulate inorganic salt to form a fluidized particulate bed layer, and the empty bed gas velocity of the carrier gas in the at least one preheating chamber is higher than the empty bed gas velocity of the carrier gas in the at least one reaction chamber, so that a particulate bed layer density in the at least one preheating chamber is smaller than a particulate bed layer density in the at least one reaction chamber,
    the at least one preheating chamber comprises a plurality of preheating chambers and the at least one reaction chamber includes a plurality of reaction chambers,
    in a preheating chamber of the plurality of preheating chambers and a next adjacent reaction chamber of the plurality of reaction chambers adjacent to and after the preheating chamber, a bottom of the preheating chamber and a bottom of the next adjacent reaction chamber are not connected each other, and a height of the at least one deflector between the preheating chamber and the next adjacent reaction chamber is lower than a height of the particulate bed layer in the preheating chamber and the next adjacent reaction chamber;
    in the preheating chamber of the plurality of preheating chambers and a previous adjacent reaction chamber of the plurality of reaction chambers adjacent to and in front of the preheating chamber, a bottom of the preheating chamber and a bottom of a previous adjacent reaction chamber are connected each other, and a height of the at least one deflector between the preheating chamber and the previous adjacent reaction chamber is higher than a height of the particulate bed layer in the preheating chamber and the previous adjacent reaction chamber.

2. The preparation device according to claim 1, wherein the at least one preheating chamber and at least one reaction chamber are connected to each other on a top gas-phase space.

3. The preparation device according to claim 2, wherein the fluidized bed reactor further comprises a gas distributor, which is located at bottoms of the at least one preheating chamber and the at least one reaction chamber, and configured to distribute the carrier gas.

4. The preparation device according to claim 1, wherein the fluidized bed reactor further comprises a solid feed port, a solid discharge port, and an exhaust port,
    the solid feed port is located at a first preheating chamber;
    the solid discharge port is located at the reaction chamber farthest from the solid feed port, for discharging a reacted solid substance;
    the exhaust port is located to connect with a gas-phase space of the reactor for discharging a reacted gaseous substance.

5. The preparation device according to claim 4, wherein the solid discharge port is located at the bottom of the reaction chamber farthest from the solid feed port;
    the solid feed port is located at an upper part of the first preheating chamber and below an upper interface of the particulate bed layer.

6. The preparation device according to claim 1, wherein interior of the at least one reaction chamber is provided the at least one atomizing nozzle located above the particulate bed layer.

7. The preparation device according to claim 1, wherein interior of the at least one reaction chamber is provided the at least one atomizing nozzle located inside the particulate bed layer.

8. The preparation device according to claim 1, wherein the number of the at least one atomizing nozzle is multiple, and interior of each of the at least one reaction chamber is provided at least two atomizing nozzles, wherein at least one of the at least two atomizing nozzles is located above the particulate bed layer, and the other one or more of the at least two atomizing nozzles is located inside the particulate bed layer.

9. The preparation device according to claim 1, wherein the at least one atomizing nozzle is a pressure spray nozzle or a centrifugal spray nozzle.

10. The preparation device according to claim 1, further comprising a gas-solid separator and a solid feed device,
the solid feed device is communicated with a solid feed port of the fluidized bed reactor for transporting the particulate inorganic salt into the at least one preheating chamber;
the gas-solid separator is communicated with an exhaust port of the fluidized bed reactor for separating a solid substance entrained by a gaseous substance discharged from the exhaust port of the fluidized bed reactor.

11. A preparation method of ammonia gas, preparing by using the preparation device according to claim 1, the method comprising steps of:
heating the carrier gas to a first preset temperature and introducing it into the at least one preheating chamber and the at least one reaction chamber;
introducing the particulate inorganic salt into a first preheating chamber of the fluidized bed reactor through a solid feed device to form the particulate bed layer and preheating it to a second preset temperature;
flowing a preheated particulate inorganic salt into a next adjacent reaction chamber under the action of a density difference of the particulate bed layers between the at least one preheating chamber and the at least one reaction chamber;
spraying the solution of ammonium chloride into the at least one reaction chamber through the at least one atomizing nozzle to contact and react with the particulate inorganic salt for generating the ammonia gas and a reacted solid substance;
introducing continuously the reacted solid substance into subsequent preheating chambers and reaction chambers under the action of the density difference of the particulate bed layers, and discharging it from a solid discharge port;
introducing the ammonia gas and the carrier gas into a gas-solid separator through an exhaust port; and
separating the ammonia gas from the carrier gas.

12. The preparation method according to claim 11, wherein a third preset temperature is a reaction temperature, and in each of the reaction chambers, a temperature in the reaction chamber is maintained not less than the third preset temperature,
wherein the first preset temperature is 100 to 300° C. higher than the third preset temperature, the second preset temperature is 0 to 250° C. higher than the third preset temperature, and the particulate inorganic salt does not decompose at the first preset temperature, the second preset temperature, and the third preset temperature.

13. The preparation method according to claim 11, wherein the particulate inorganic salt comprises one or a mixture of any ratios of calcium silicate, magnesium silicate, sodium metasilicate, and potassium silicate, and the particulate inorganic salt has a particle diameter of 0.5 mm to 2 mm.

14. The preparation method according to claim 11, wherein the carrier gas comprises air.

\* \* \* \* \*